Jan. 5, 1932.    K. T. KELLER ET AL    1,840,106

TRANSMISSION

Filed Sept. 9, 1929    7 Sheets-Sheet 3

INVENTOR
KAUFMAN T. KELLER AND
BY JAMES W. HUGHES.
ATTORNEY

Jan. 5, 1932.   K. T. KELLER ET AL   1,840,106
TRANSMISSION
Filed Sept. 9, 1929   7 Sheets-Sheet 4

INVENTOR
KAUFMAN T. KELLER AND
BY JAMES W. HUGHES.
ATTORNEY

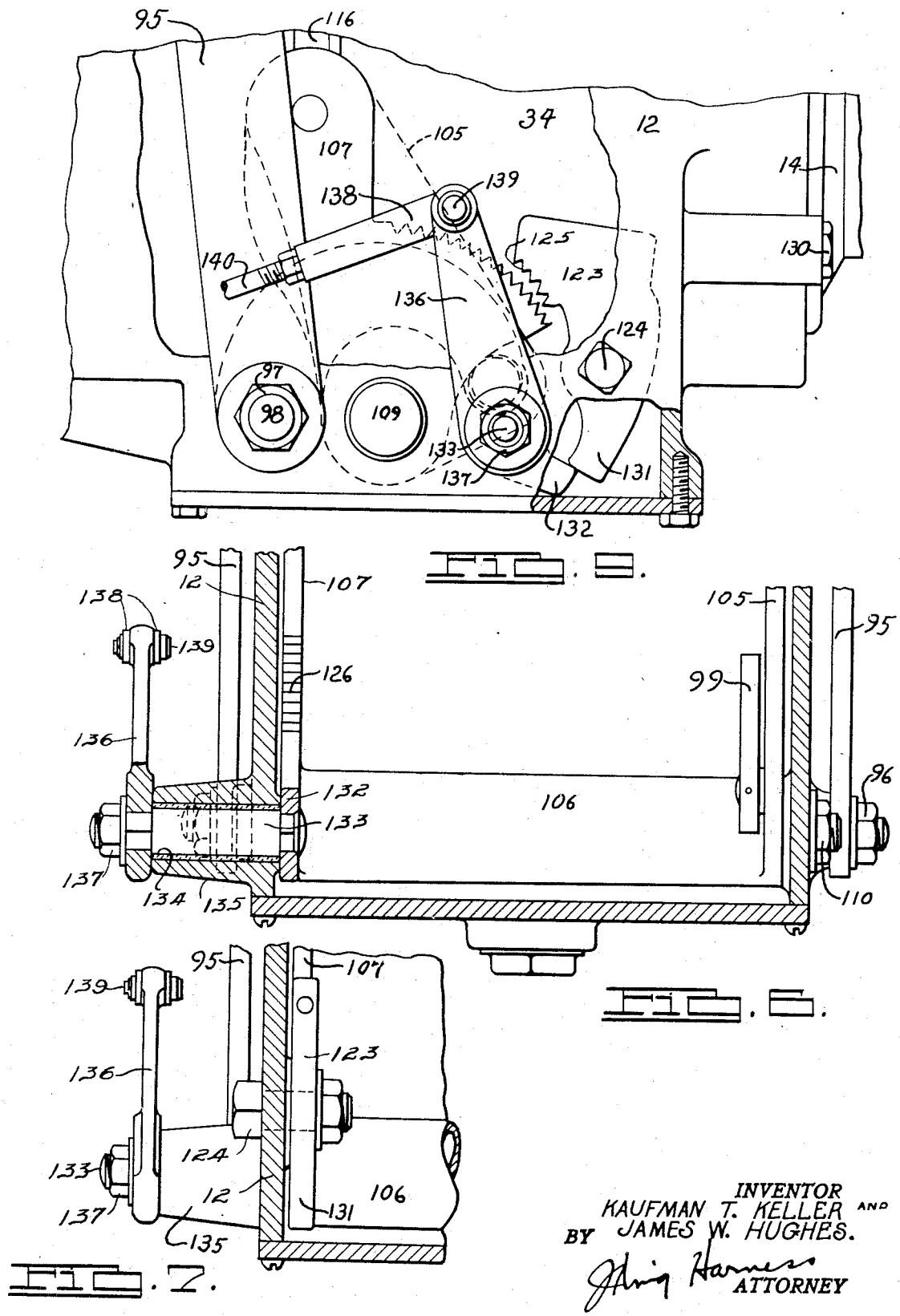

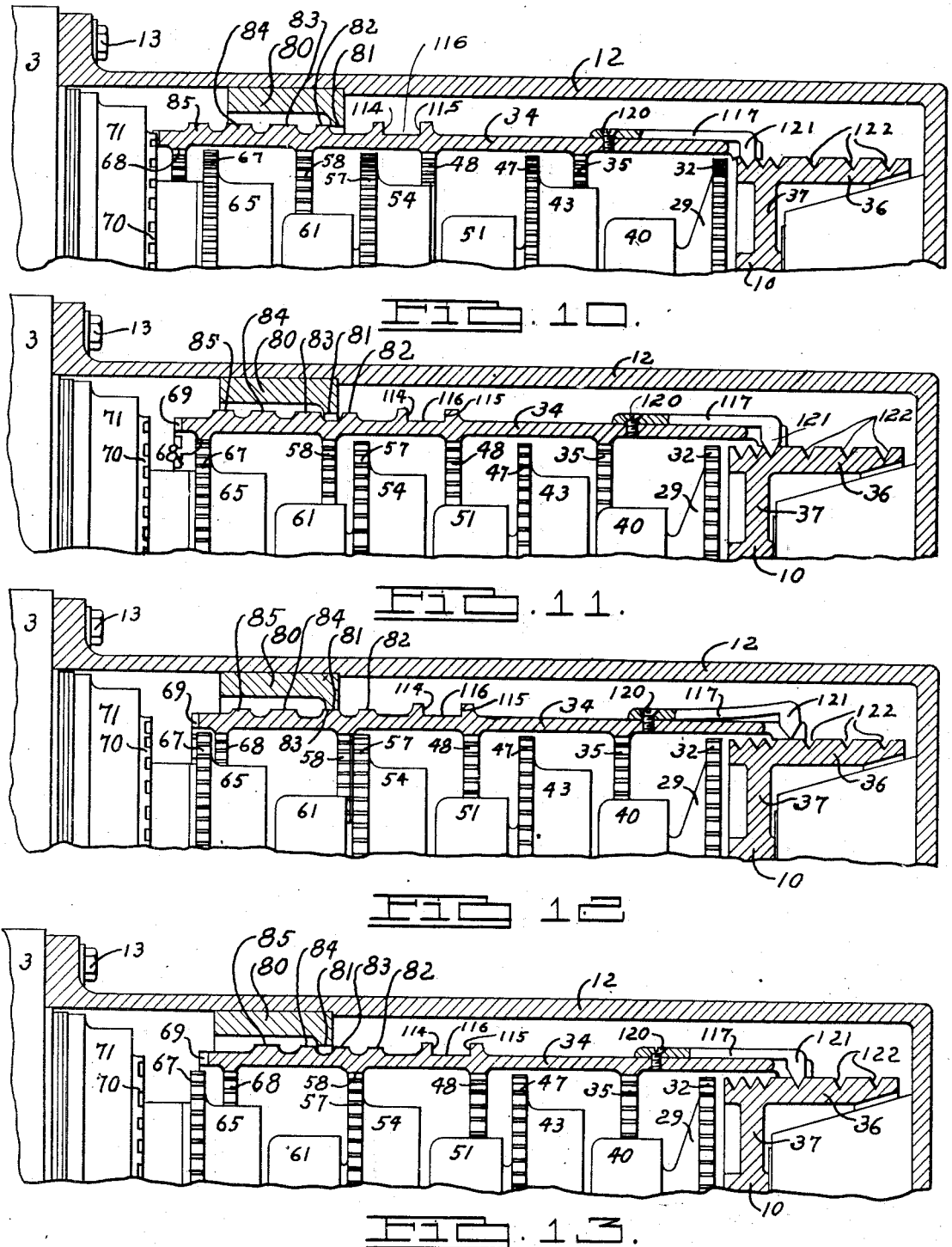

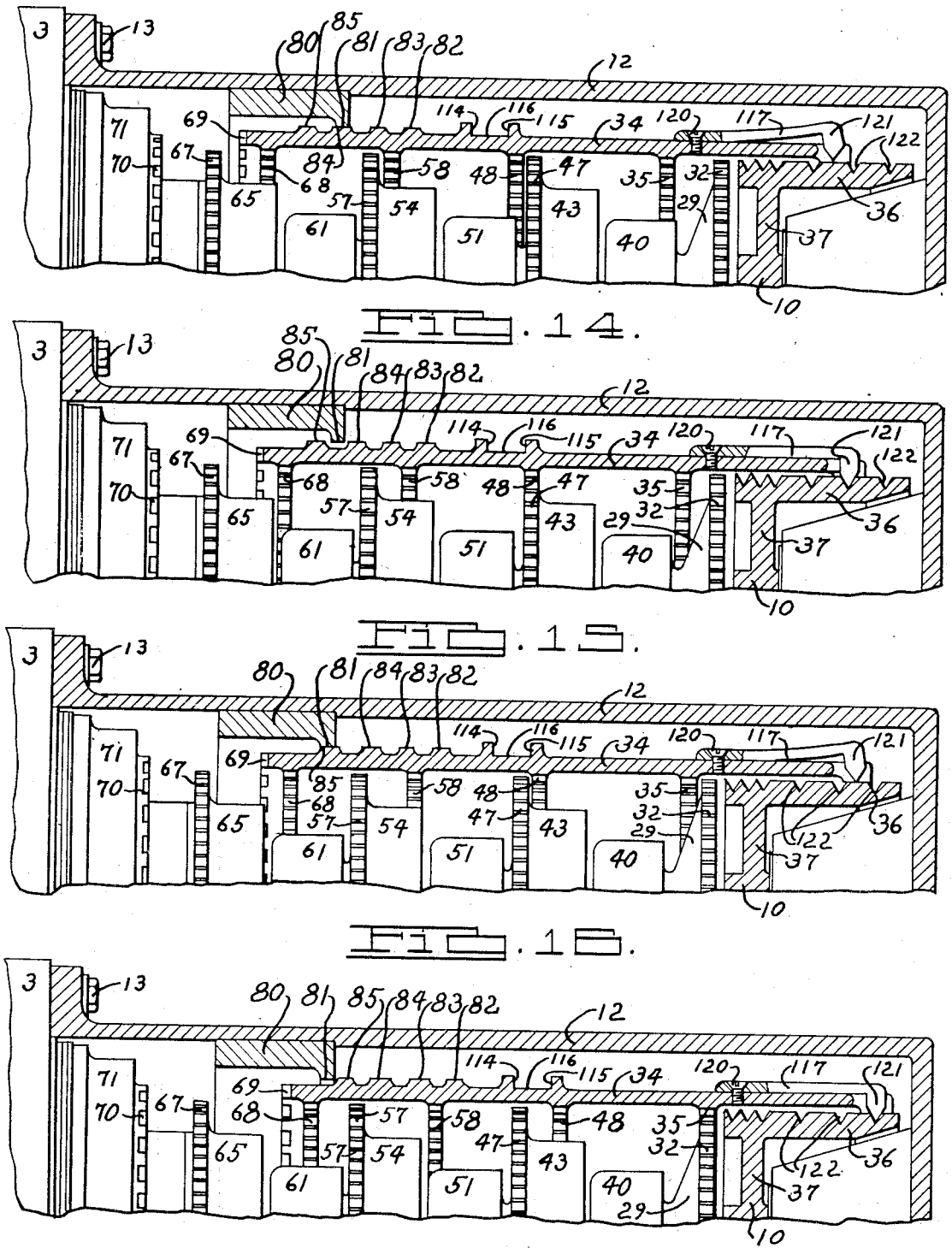

Patented Jan. 5, 1932

1,840,106

UNITED STATES PATENT OFFICE

KAUFMAN T. KELLER AND JAMES W. HUGHES, OF DETROIT, MICHIGAN, ASSIGNORS TO CHRYSLER CORPORATION, OF DETROIT, MICHIGAN, A CORPORATION OF DELAWARE

TRANSMISSION

Application filed September 9, 1929. Serial No. 391,457.

This invention relates to a multi-speed transmission particularly suitable for automobiles.

The main objects of this invention are to provide an improved transmission gearing which will have four speed ratios in a forward direction and a reverse gear; to provide a transmission which will be substantially noiseless in operation for each different gear; to provide an improved transmission gearing of the progressive type as distinguished from the selective type; to provide a transmission mechanism in which all of the gear reductions are through a series of internal-external gears; and to provide transmission gearing in which all of the reduction gears are in constant mesh.

An illustrative embodiment of this invention is shown in the accompanying drawings in which:

Fig. 6 is a fragmentary sectional view taken on the line 6—6 of Fig. 1.

Fig. 7 is a fragmentary sectional view taken on the line 7—7 of Fig. 1.

Fig. 9 is a fragmentary view in elevation, with parts therefo broken away to show the interior construction, which shows a different position for some of the operating parts.

Fig. 10 is a fragmentary sectional view showing the relative positions of the mechanism when in reverse gear position.

Fig. 11 is a similar view showing the mechanism when in low or first gear position.

Fig. 12 is a similar view showing the mechanism when in a neutral position between first and second gears.

Fig. 13 is a similar view showing the mechanism when in second gear position.

Fig. 14 is a similar view showing the mechanism when in neutral position when between second and third gears.

Fig. 15 is a similar view showing the mechanism when in third gear speed position.

Fig. 16 is a similar view showing the mechanism when in neutral position between third and fourth gears.

Fig. 17 is a similar view showing the mechanism when in fourth or high speed position.

Figure 1:
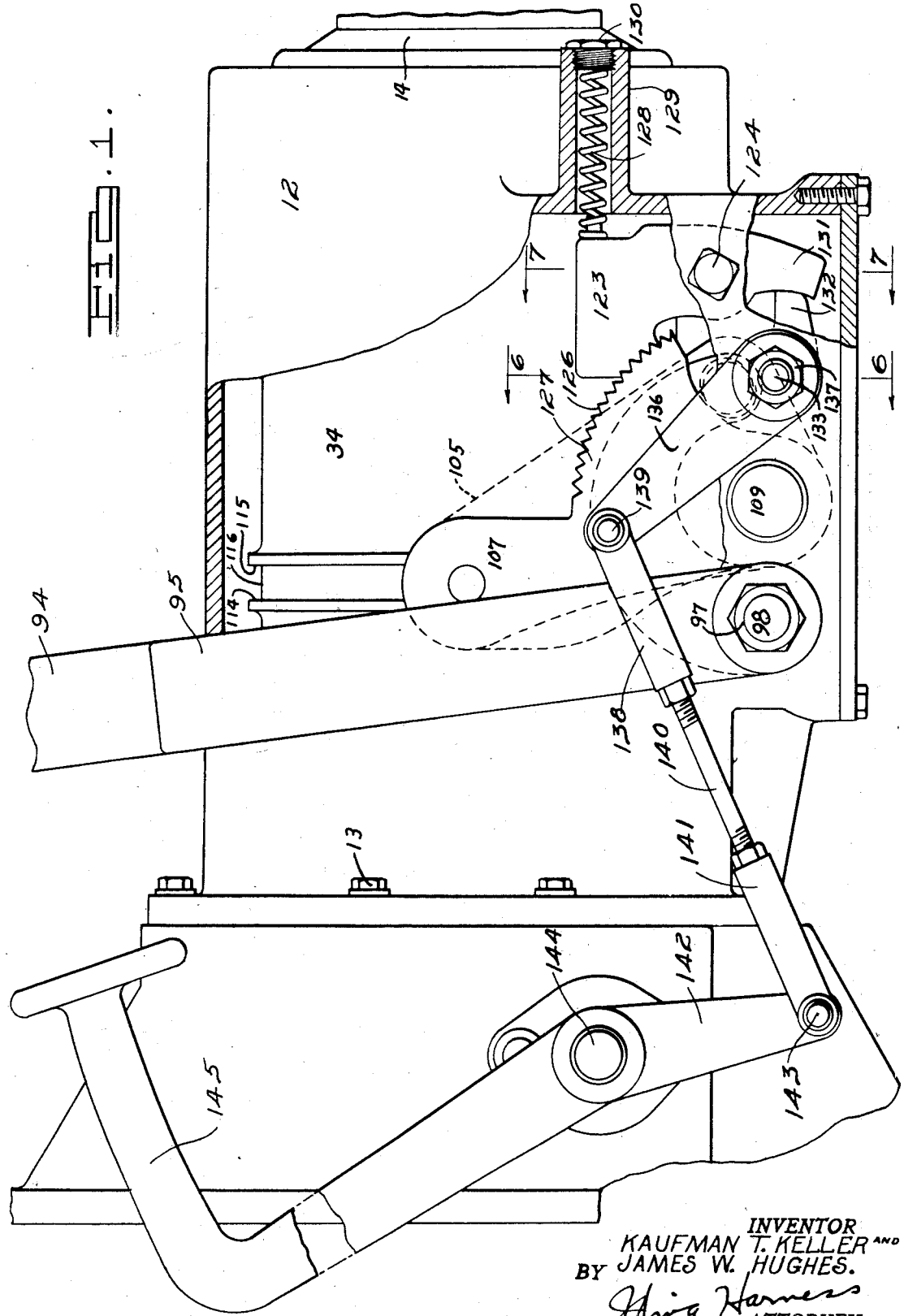
Fig. 1 is a view in left side elevation of the improved transmission gear mounted on the clutch housing of an internal combustion engine, portions thereof being broken away to show the interior construction.

In the construction shown in the drawings, a driving shaft 1 is journaled concentrically within and in spaced relation to a bearing supporting sleeve 2, the forward end of which is rigidly secured in a clutch housing 3 by a key 4 and a nut 5. The nut 5 is threaded on the extreme forward end of the sleeve, and a lock washer 6 is provided for preventing the accidental loosening of the nut 5. The shaft 1 has its forward end connected to the clutch of an internal combustion engine in the usual manner.

The extreme rear end of the shaft 1 is of reduced diameter and is supported by an annular ball bearing 7, the outer race 8 of which is secured by a spring retainer ring 9 in a concentrically formed recess of a driven member 10. The driven member 10 is journaled adjacent its rear end on an annular ball bearing 11 mounted in the rear end of a transmission housing 12 which is secured to the clutch housing 3 by suitable means such as cap screws 13. The front end of the member 10 is journaled on a roller bearing 11A which is also supported by the housing 12.

The ball bearing 11 is retained in the rear end of the housing 12 by an annular collar 14 which surrounds the driven member 10 in spaced relation thereto and which is secured to the transmission housing 12 by cap screws 15. The rear end of the driven member 10 is splined to receive the complementary splined hub of a flange member 16 which is secured thereon by a nut 17. The inner race of the ball bearing 11 is securely held by a follower sleeve 18, one end of which abuts against the race and the other end of which is engaged by one face of a speedometer drive gear 19, the opposite face of which is engaged by the inner end of the hub of the flange member 16.

Means are provided for excluding dust and dirt from the speedometer drive gear 19 and comprises a felt ring 20 mounted in a U-shaped retainer 21 which is frictionally mounted in the open rear end of the collar 14.

The inner race of the ball bearing 7 is secured on the reduced end of the drive shaft 1 by a cap nut 22 which is threaded on the extreme tip end of the shaft. Means are provided for locking the nut 22 on the end of the shaft and comprise a plunger 23 slidably mounted in a bore 24 provided in the threaded end of the shaft 1 in spaced parallel relation to the axis of the shaft. A helical compression spring 25 is provided in the bore 24 for normally urging the plunger 23 outwardly in the position shown in Fig. 2 of the drawings. The end face of the cap nut 22 is provided with a series of spaced openings which are in position to register with and receive the protruding end of the plunger 23.

A special wrench is provided for manipulating this cap nut and includes a shank 26 which has a series of pins 27 on the end thereof which are positioned so as to register with and enter the apertures formed in the end face of the cap nut 22 when placed in registry therewith. Insertion of the pins 27 will slide the plunger 23 inwardly so that the cap nut may be turned upon rotation of the shank 26, through the medium of the pins 27. The driven member 10 is provided with an axially extending bore 28 through which the shank 26 of the special wrench may be inserted.

The rear end of the drive shaft 1, immediately forward of its supporting bearing, is provided with an external gear 29 rigidly secured thereon by a key 30. The external gear 29 is provided with a radially extending flange 31, the peripheral marginal edge of which is notched to provide axially extending clutch teeth 32. An axially slidable sleeve 34 surrounds the gear 29 in spaced relation to the clutch teeth 32. The inner surface of the sleeve 34 is provided with an annular row of inwardly extending clutch teeth 35 which are adapted to interfit with the clutch teeth 32 when axially shifted into registration therewith. The rear end of the cylindrical sleeve 34 is splined to an axially extending flange 36 integrally formed on a radially extending flange 37 of the driven member 10, so that rotation is imparted to the driven member 10 by the sleeve 34 when the clutch teeth 35 of the sleeve are in engagement with the clutch teeth 32 of gear 29.

A roller bearing 38 is interposed between the external gear 29 and the rigidly mounted sleeve 2, a hardened steel washer 39 being provided for abutting against the ends of the rollers for holding them in position.

The external gear 29 is in constant mesh with and drives a compound internal-external gear 40 which is journaled on bearings 41 on the sleeve 2 in eccentric relation to the axis of the drive shaft 1.

The external gear teeth 42 of the compound gear 40 are in constant mesh with and drive the internal gear teeth 43 of a compound internal-external gear 44 which is journaled by roller bearings 45 on the sleeve 2 in concentric relation with respect to the drive shaft 1. The compound gear 44 is provided with a radially extending flange 46, in the marginal edge of which is cut a series of clutch teeth 47 which are adapted to interfit and engage with an annular series of inwardly extending clutch teeth 48 integrally formed on the inner surface of the sleeve 34.

The external gear teeth 49 of compound gear 44 are in constant mesh with and drive the internal gear teeth 50 of a compound internal-external gear 51 which is journaled by roller bearings 52 on the sleeve 2 in concentric relation with respect to the axis of the drive shaft 1. The external gear teeth 53 of compound gear 51 are in constant mesh with and drive the internal gear teeth 54 of a compound internal-external gear 55 which is journaled by roller bearings 56 on the sleeve 2 in concentric relation with respect to the axis of the drive shaft 1. The compound gear 55 is provided with a radially extending flange which has a series of axially extending clutch teeth 57 cut in the peripheral margin thereof for interfitting with and engaging an annular series of inwardly extending clutch teeth 58 integrally formed on the inner surface of the sleeve 34.

The external gear teeth 59 of compound gear 55 are in constant mesh with and drive the internal gear teeth 60 of a compound internal-external gear 61 which is journaled by a series of roller bearings 62 on the sleeve 2 in eccentric relation with respect to the axis of the drive shaft 1. The external gear teeth 63 of the compound gear 61 are in constant mesh with and drive the internal teeth 64 of a compound internal-external gear 65 which is journaled by a series of roller bearings 66 on the sleeve 2 in concentric relation with respect to the drive shaft 1. The compound gear 65 is provided with a radially extending flange which has a series of axially extending clutch teeth 67 cut in the peripheral margin thereof which are adapted to interfit with and engage an annular series of inwardly extending clutch teeth 68 integrally formed on the inner surface of sleeve 34, when said sleeve is axially shifted to bring the teeth in registry.

The forward edge of the sleeve 34 is provided with a series of radially extending clutch teeth 69 which are adapted to interfit with and be engaged by a series of similarly disposed clutch teeth 70 integrally formed on the rear face of a reverse gear 71 which is journaled by a series of roller bearings 72 on the axially extending sleeve portion 73 of the compound gear 65 in concentric relation thereto. The forward end of the sleeve 73 supports the external gear teeth 74 of the compound gear 65 and these external teeth are in constant mesh with the teeth of three spur pinion gears 75, 76, 77. The pinions 75, 76, and 77 are equidistantly spaced about the external gear 74 and are journaled on the clutch housing 3 by suitable double annular ball bearings 78. The pinions 75, 76 and 77 are also in constant mesh with internal gear teeth 79 of the reverse gear 71 so as to rotate said gear in a direction opposite to the direction of rotation of the compound gear 65.

The transmission housing 12 rigidly supports an annular ring 80 which has a relatively narrow inwardly extending flange 81 at one end thereof which provides a bearing support for the sleeve 34. The sleeve 34 has a series of radially extending annular ribs 82, 83, 84 and 85 integrally formed on its outer surface in axially spaced relation which serve as bearing surfaces for registering with the flange 81 when the sleeve 34 is in any of its neutral positions.

Means are provided for lubricating the various series of roller bearings which are journaled on the sleeve 2 and comprise an axially extending oil duct 86 drilled in the sleeve 2 and from which suitable branch ducts 87, 88, 89, 90, 91, 92 and 93 lead to the various bearings so as to insure an adequate supply of lubricant to each. These branch ducts are of progressively increasing diameter to equalize for the increasing distances from the forward inlet end of the main duct 86.

Means are provided for sliding the sleeve 34 axially to its various different positions and comprise a shifter handle 94 mounted on a yoke 95 of inverted U-shape, the lower ends of the arms of which are rigidly secured by nuts 96 and 97 respectively on the squared ends of a transversely disposed shaft 98. The shaft 98 is journaled in the side walls of the transmission casing 12 at the lower medial part thereof and closely adjacent one side wall of the casing 12, the shaft 98 is provided with an arcuate arm 99 which has its hub 100 rigidly secured thereto by a pin 101 and key 102.

The outer end of the arm 99 is provided with a transverse pin 103 which protrudes from one side thereof and which is embraced in a slightly elongated aperture 104 of a triangular shaped upstanding arm 105. The lower end of arm 105 is welded to one end of a sleeve 106 which is transversely disposed between the side walls of the transmission casing 12 in spaced parallel relation to the shaft 98 and rearwardly thereof. The opposite end of the sleeve 106 has a similar upstanding arm 107 welded thereto and said sleeve is concentrically journaled on a bolt 108 which extends through the side walls of the transmission case 12. The bolt 108 has a head 109 which abuts against the outer side of one side wall, and a nut 110 and washer 111 which abuts against the outer side of the other side wall.

The upstanding top ends of the arms 105 and 107 embrace diametrically opposite sides of the sleeve 34 and pivotally support elongated guide shoes 112 and 113 respectively. The guide shoes 112 and 113 are snugly embraced between the side walls 114 and 115 of an annular groove 116 which is cut in the outer peripheral surface of the sleeve 34.

Means are provided for releasably retaining the sleeve 34 in its various positions for the different gear ratios and comprise a series of spring clips 117, 118 and 119 which are mounted in equidistantly spaced relation on the rear end of the sleeve 34. The forward ends of the clips are secured to the sleeve by screws 120 and the rear ends of said clips are bent inwardly at right angles. The tip ends of said bent portions are tapered as shown at 121 so as to fit within a series of spaced V-shaped grooves 122 cut in the outer periphery of the axially extending flange 36 of driven member 10.

Means are provided for preventing the sleeve 34 from being shifted when the clutch mechanism of the internal combustion engine is engaged and comprise a dog 123 pivotally mounted on a bolt 124 mounted in one side wall of the transmission case 12. The dog 123 has an arcuate face provided with a series of V-shaped teeth 125 which are yieldingly urged into engagement with a similar series of teeth 126 formed on an arcuate portion 127 of arm 107, by a helical compression spring 128 mounted in a tubular boss 129 integrally formed on the rear wall of the transmission casing 12. A threaded plug 130 is screwed into the rear end of the tubular boss 129 for retaining the spring 128 in yielding engagement with the dog 123. The dog 123 is provided with a depending lug portion 131 which is engaged by a toe 132 rigidly mounted on the inner square end of a shaft 133 which is journaled in a bearing sleeve 134. The sleeve 134 is mounted in an outstanding tubular boss 135 integrally formed on one side wall of the transmission case 12.

The outer end of the shaft 133 is also square and rigidly supports one end of a lever 136 which is secured thereon by a nut 137. The other end of lever 136 is pivoted between the arms of a yoke 138, by a pin 139. The yoke 138 is adustably threaded on one end of a rod 140, the other end of which is threaded into a similar yoke 141. The arms of the yoke 141 embrace the lower end of a depending arm 142 and is pivotally connected thereto by a pin 143. The upper end of the arm 142 is rigidly connected to the clutch yoke shaft 144 which is operated by a foot pedal 145 in the usual manner.

Figure 2:
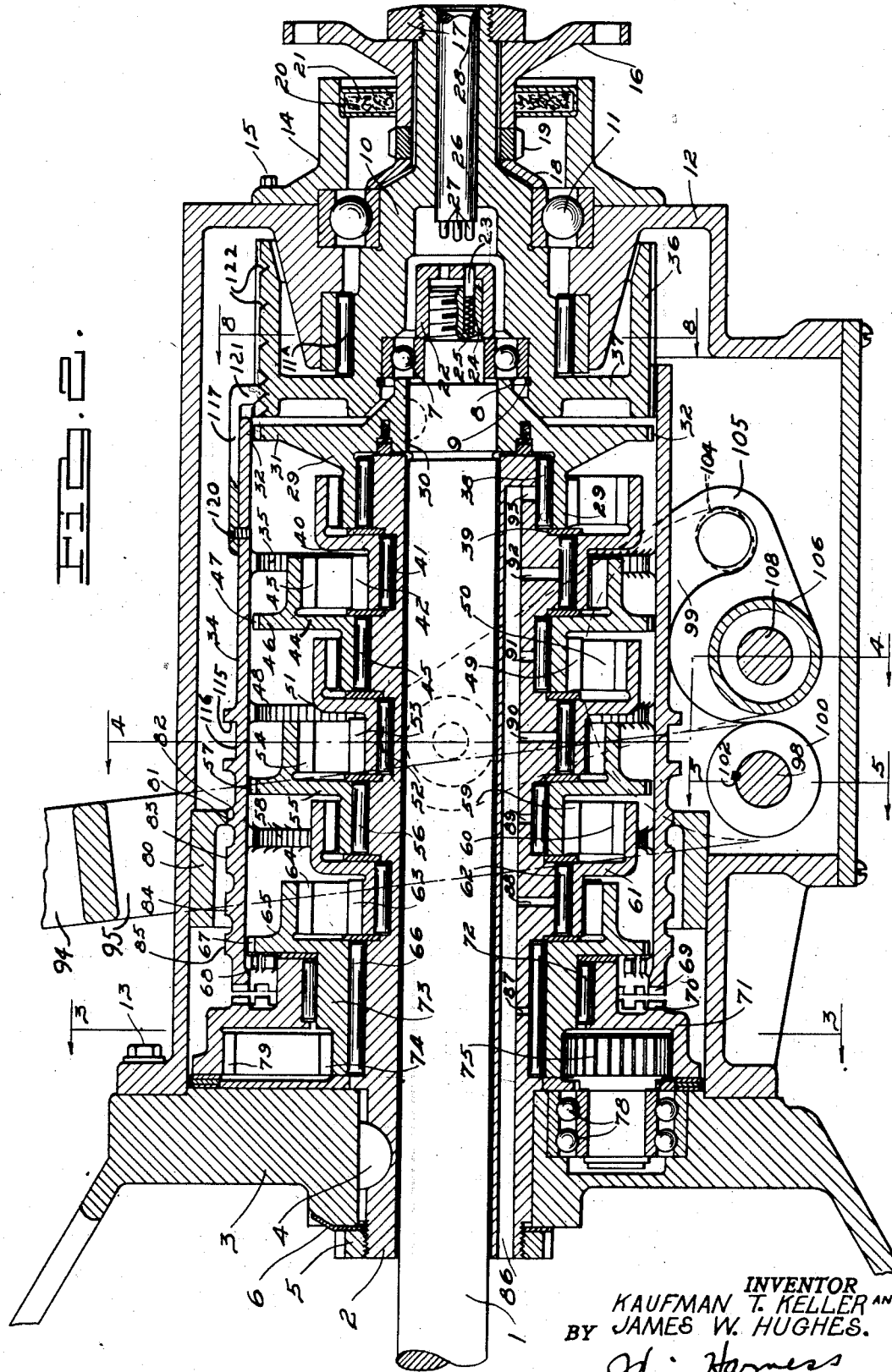
Fig. 2 is a vertical medial longitudinal sectional view of the same.
Figure 3:
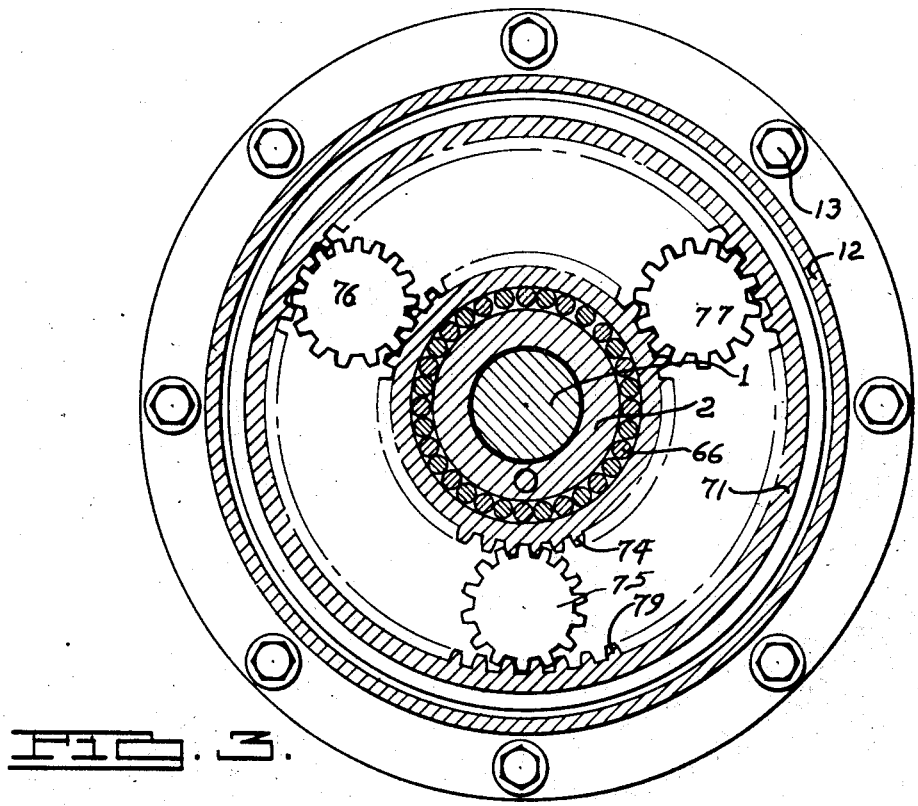
Fig. 3 is a sectional view taken on the line 3—3 of Fig. 2.
Figure 8:
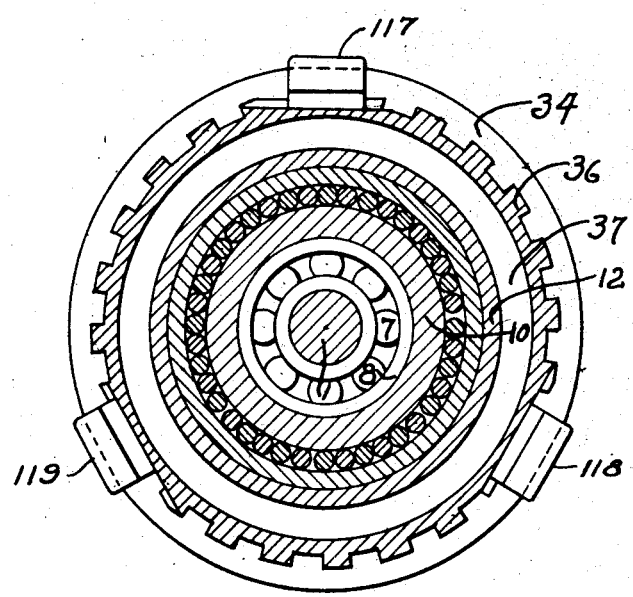
Fig. 8 is a sectional view taken on the line 8—8 of Fig. 2.
Figure 4:
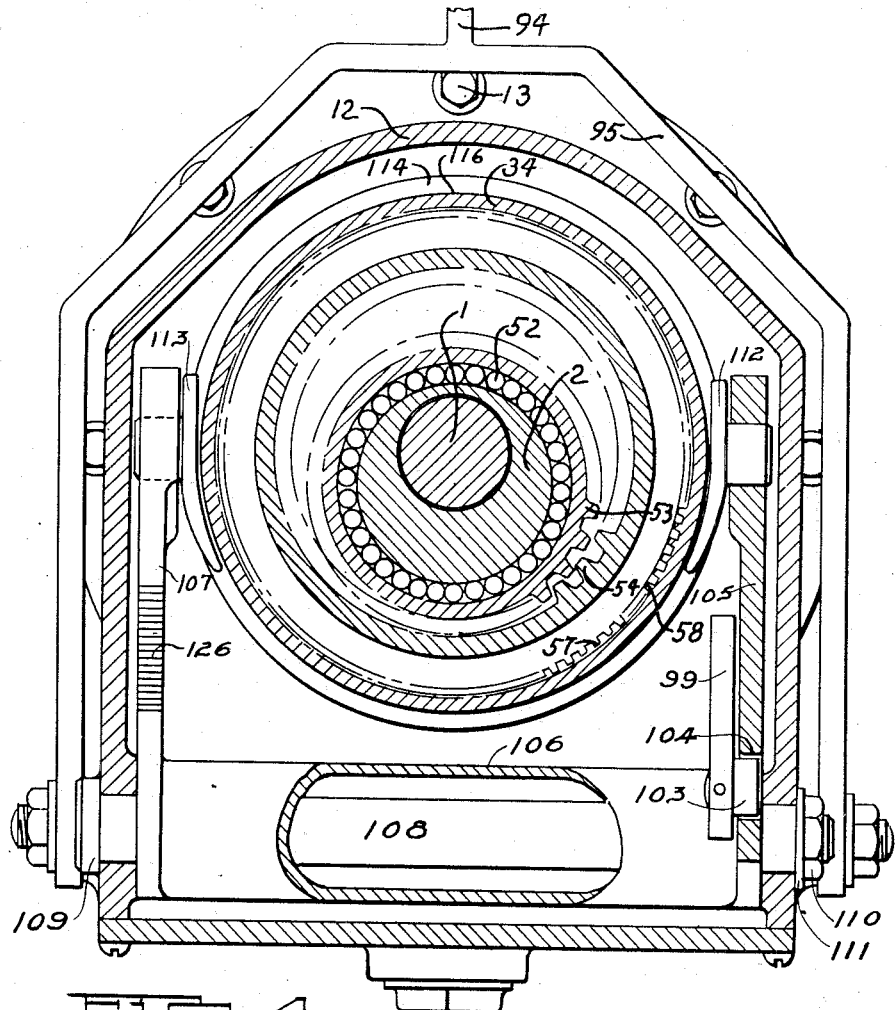
Fig. 4 is a sectional view taken on the line 4—4 of Fig. 2.
Figure 5:
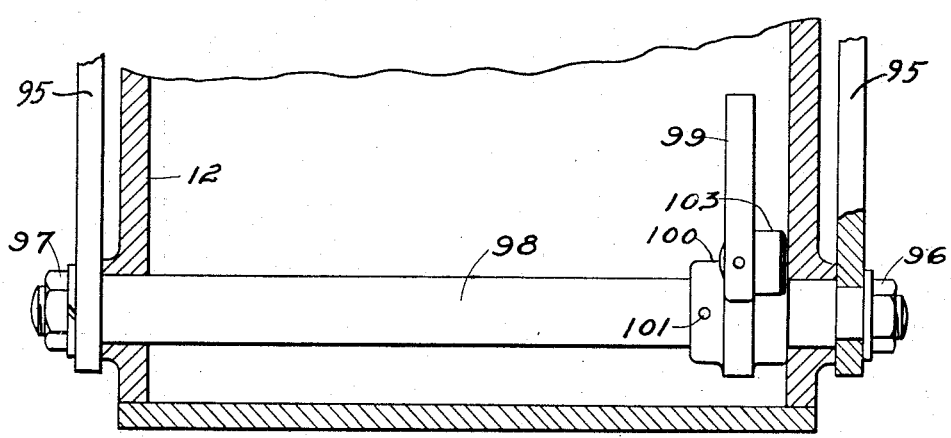
Fig. 5 is a fragmentary sectional view taken on the line 5—5 of Fig. 2.

In the operation of this transmission mechanism, assuming that the sleeve 34 is in the neutral position as shown in Fig. 2 of the drawings and it is desired to transmit motion in a reverse direction, the foot pedal 145 of the clutch is depressed for the purpose of disengaging the clutch. Such movement of the foot pedal causes the depending arm 142 to rock the arm 136 rearwardly through the medium of yokes 138, 141, connecting rod 140, to the position shown in full lines in Fig. 9. The rocking movement is so adjusted that the toe 132 will move to a position below the lower end of the lug 131 of the dog 123, thereby permitting the dog 123 to move rearwardly against the action of the compression spring 128.

The transmission shift handle 94 is then grasped and pushed forwardly thus causing the shoes 112 and 113 carried by the upstanding arms 105 and 107 to slide the sleeve 34 forwardly to the position shown in Fig. 10 of the drawings. When the sleeve is in this position the teeth 69 on the forward end of the sleeve are in engagement with the clutch teeth 70 of reverse gear 71. During this movement, the teeth 126 on the arcuate portion 127 of arm 107, cam the teeth 125 on the contacting face of dog 123 outwardly so as to cause the teeth on the dog to ride over the ends of the teeth on the arm. At the same time the spring clips 117, 118 and 119 ride up the inclined sides of their V-shaped grooves and drop down into the groove 122 so as to yieldingly retain the sleeve clutch teeth in engagement with the reverse gear clutch teeth. The foot pedal 145 is then released by the operator so as to engage the clutch thus connecting drive shaft 1 to its source of power.

Rotation of the drive shaft 1 imparts rotation to the compound gear 29 which is keyed thereon and from this gear through the entire series of compound internal-external gears to the pinions 75, 76 and 77 which in turn impart reverse rotation to the reverse gear 71, thus rotating the sleeve 34. The rear end of the sleeve 34 being splined on the flange 36 thereby rotates the driven member 10.

Assuming that the mechanism is in a neutral position as before and as shown in Fig. 2 of the drawings, when it is desired to secure rotation in a forward direction, the clutch pedal is depressed in the same manner as hereinbefore described. The gear shifter rod 94 is moved rearwardly until the tapered ends 121 of the spring clips 117, 118 and 119 snap into the first notch rearwardly from the neutral position. Such movement of the sleeve engages the clutch teeth 67 of compound gear 65 with the clutch teeth 68 of sleeve 34. When in this position rotation of the drive shaft 1 will impart rotation in the same direction to the sleeve 34 through the medium of the series of internal-external reduction gears which are interposed between the compound gear 29 and the compound gear 65. This position of low gear or first speed is shown in Fig. 11 of the drawings.

Further movement of the sleeve 34 in the rearward direction will bring the sleeve to the position shown in Fig. 12 of the drawings which is a neutral position between first and second gear speeds. Further rearward movement will bring the sleeve to the position shown in Fig. 13 of the drawings in which position the clutch teeth 57 of compound gear 55 will be in engagement with the clutch teeth 58 of sleeve 34. Rotation will thus be imparted to the sleeve 34 upon rotation of the drive shaft 1 but with a lesser amount of gear reduction than hereinbefore described with the parts in first gear position.

A further movement of the sleeve to the rear as shown in Fig. 14 of the drawings will bring the mechanism to a neutral position between second and third gear, and still further movement will then bring the parts to the position shown in Fig. 15 of the drawings which is third speed position. In this position the clutch teeth 47 of compound gear 46 will be in engagement with the clutch teeth 48 of the sleeve 34, and the spring clips 117, 118 and 119 will be in the series of notches 122.

By moving the sleeve 34 again to the rear, the parts will be in a neutral position as shown in Fig. 16 of the drawings and still further movement of the sleeve will bring the various parts to the fourth speed of high gear position as shown in Fig. 17 of the drawings. When in this position the clutch teeth 32 of the external gear 29 will be in engagement with the clutch teeth 35 of sleeve 34 and thus rotation of the drive shaft 1 will impart rotation to the sleeve 34 in a 1:1 ratio, i. e., direct drive without gear reduction.

The annular ribs 82, 83, 84 and 85 which provide bearing surfaces for the sleeve 34 are so positioned and spaced apart that when the mechanism is in any driving position the bearing flange 81 will be positioned in the space between two of the ribs and not in contact therewith, the sleeve being supported by engagement of the clutch teeth when in such position and therefore not requiring any exterior bearing support, thus reducing the amount of friction present in the mechanism.

Although but one specific embodiment of this invention has been herein shown and described, it will be understood that numerous details of the construction shown may be altered or omitted without departing from the spirit of this invention as defined by the following claims.

We claim:

1. A power transmission mechanism comprising a driving member, a gear train comprising a plurality of permanently entrained gears driven at different speeds by said driving member, said gears being arranged alternately concentric and eccentric with respect to said driving member, radially extending clutch teeth on said concentric gears, a sleeve surrounding said gear train, inwardly extending clutch teeth on said sleeve, means for shifting said sleeve axially to engage the clutch teeth of said sleeve with the clutch teeth of one of said gears, and a driven member actuated by said sleeve.

2. A power transmission mechanism comprising a driving member, a gear train including a series of permanently meshed compound internal-external reduction gears driven by said member, clutch teeth on said gears, a driven member, a sleeve surrounding said gear train and drivably connected to said driven member, a plurality of series of clutch teeth on said sleeve, each of the series of clutch teeth of said sleeve being engageable with the clutch teeth of one gear respectively, and means for shifting said sleeve so as to bring the clutch teeth thereof into mesh with the clutch teeth of said reduction gears.

3. A power transmission mechanism comprising a driving member, a gear train driven by said driving member including a plurality of compound internal-external gears, said gears being arranged alternately concentric and eccentric with respect to said driving member, radially extending clutch teeth on said concentric compound gears, a sleeve surrounding said gear train, a plurality or rows of inwardly extending clutch teeth on the inner periphery of said sleeve, one row being provided for each of said concentric gears, means for moving said sleeve to engage the clutch teeth thereof with the complementary clutch teeth of said gears, and a driven member actuated by said sleeve.

4. A mechanical power transmission mechanism comprising a prime rotating driving member, a series of rotating members arranged about the axis of said driving member and arranged to be driven simultaneously but at different speeds by said driving member, a final rotating driven member with respect to which said series of members are freely rotatable, and an axially slidable clutch sleeve arranged in embracing relation with respect to said rotating members and having individual means for positively connecting said driven member to each of said rotating members respectively.

5. A mechanical power transmission mechanism comprising a prime rotating driving member, a final rotating driven member, a series of intermediate members rotatable about the axis of said driven member and arranged to be driven by said driving member simultaneously but at different speeds, a fixed bearing member about which all of said intermediate members rotate, and an axially slidable clutch sleeve embracing said intermediate rotating members and having individual means for connecting said final driven member to each of said intermediate members whereby to effect its rotation in unison with that particular intermediate member to which it is clutched, said individual engaging means being engageable with only one of said intermediate rotating members at a time.

6. A mechanical power transmission mechanism comprising a prime rotating driving member, a series of permanently entrained gears driven at different speeds by said driving member, all of said entrained gears being arranged in encircling relation with respect to said driving member, a fixed bearing element upon which all of said gears rotate, a final rotating driven member, and an axially slidable clutch sleeve embracing said gears and having spaced means for individually connecting said final rotating driven member to each of said intermediate rotating gears respectively whereby to cause said final driven member to be rotated at a speed equal to the speed of rotation of the intermediate rotating gear to which it is connected.

7. A mechanical power transmission mechanism comprising a prime rotating driving member, a series of intermediate rotating members, a fixed bearing member about which all of said intermediate members rotate, connections between said driving member and said intermediate rotating members for driving said intermediate members at different speeds, a final rotating driven member and an axially slidable clutch sleeve having a plurality of spaced series of clutch teeth thereon, one series being engageable with each intermediate member respectively for connecting said driven member with various one of said intermediate members.

8. A power transmission mechanism including driving and driven elements, a gear train operable by said driving element including a plurality of different speed gears, clutch teeth on each of said gears, and a shiftable sleeve co-acting with said driven member and having a plurality of series of clutch teeth, each series being in related proximity to one of said gears and only one of said series being adapted to mesh with the teeth of one of said gears at a time.

9. A power transmission mechanism including a driving member, a series of permanently entrained gears driven at different speeds by said driving member, a driven member, and a shiftable member secured against rotation relative to said driven member and having a series of connecting means, one for coacting with each of said gears, respectively, successive pairs of corresponding connecting means and gears being spaced further apart than the preceding corresponding connecting means and gears when said shiftable member is in its initial position.

10. A power transmission mechanism including a driving member, a series of permanently entrained gears driven at different speeds by said driving member, a driven member, and a single axially shiftable clutch member splined on said driven member having spaced series of clutch teeth thereon, each of said series being successively engageable with a different one of said gears during movement of said shiftable clutch element in one direction.

11. A power transmission mechanism including a driving member, a gear train including a series of permanently meshed compound internal-external reduction gears driven by said member, a driven member, and a shiftable member secured against rotation on said driven member and having a plurality of spaced elements, one for positively connecting each one of said gears to said driven member at different intervals during movement of said shiftable member in one direction.

12. A power transmission mechanism including driving and driven elements, a gear train operable by said driving element including a plurality of different speed gears, clutch teeth on each of said gears, and a shiftable sleeve co-acting with said driven member and having a plurality of series of clutch teeth, each successive series being spaced further from its corresponding gear than the preceding series is spaced from its corresponding gear than the preceding series is spaced from its corresponding gear when said shaft is in its initial position and each series being adapted to mesh with the teeth of only one of said gears, respectively.

13. A power transmission mechanism including driving and driven members, a gear train including a plurality of permanently entrained gears driven at different speeds by said driving member, a shiftable sleeve surrounding said entrained gears secured against rotation relative to said driven member, cooperative clutch teeth on said sleeve and gears respectively, and means for shifting said sleeve so as to bring the clutch teeth thereof into engagement with the clutch teeth of one of said gears.

14. A power transmission mechanism including driving and driven members, a gear train including a plurality of permanently entrained gears driven at different speeds by said driving member, a shiftable sleeve surrounding said entrained gears and secured against rotation relative to said driven member, co-operative positive connecting elements on said sleeve and gears respectively, and means for shifting said sleeve so as to bring the positive connecting elements thereof into interlocking engagement with the positive connecting elements of one of said gears.

KAUFMAN T. KELLER.
JAMES W. HUGHES.